US012537330B2

(12) United States Patent
Hsieh

(10) Patent No.: US 12,537,330 B2
(45) Date of Patent: Jan. 27, 2026

(54) CONNECTOR

(71) Applicant: BizConn International Corp., Guangdong (CN)

(72) Inventor: Chin-An Hsieh, Shenzhen (CN)

(73) Assignee: BizConn International Corp., Shenzhen (CN)

( * ) Notice: Subject to any disclaimer, the term of this patent is extended or adjusted under 35 U.S.C. 154(b) by 349 days.

(21) Appl. No.: 18/140,519

(22) Filed: Apr. 27, 2023

(65) Prior Publication Data

US 2023/0378680 A1 Nov. 23, 2023

(30) Foreign Application Priority Data

May 19, 2022 (CN) ......................... 202210556522.4

(51) Int. Cl.

| | |
|---|---|
| ***H01R 13/40*** | (2006.01) |
| ***H01R 12/70*** | (2011.01) |
| ***H01R 12/72*** | (2011.01) |
| ***H01R 13/405*** | (2006.01) |
| ***H01R 13/6596*** | (2011.01) |

(52) U.S. Cl.

CPC ....... *H01R 13/405* (2013.01); *H01R 12/7005* (2013.01); *H01R 12/724* (2013.01); *H01R 13/6596* (2013.01)

(58) Field of Classification Search

CPC ......................... H01R 13/405; H01R 12/7005; H01R 12/724; H01R 13/6596; H01R 13/6585; H01R 13/6582; H01R 24/60; H01R 13/652; H01R 13/2414; H01R 24/00

See application file for complete search history.

(56) References Cited

U.S. PATENT DOCUMENTS

| | | | | | |
|---|---|---|---|---|---|
| 5,083,945 | A * | 1/1992 | Miskin | H01R 13/6582 | 439/108 |
| 6,234,841 | B1 * | 5/2001 | Chang | H01R 13/6582 | 439/607.25 |
| 6,238,244 | B1 * | 5/2001 | Yang | H01R 12/725 | 439/541.5 |
| 6,416,358 | B1 * | 7/2002 | Kamarauskas | H01R 13/506 | 439/607.38 |
| 6,478,622 | B1 * | 11/2002 | Hwang | H01R 13/6596 | 439/607.2 |
| 9,231,356 | B1 * | 1/2016 | Ju | H01R 24/78 | |

(Continued)

FOREIGN PATENT DOCUMENTS

CN 110416829 A 11/2019

*Primary Examiner* — Truc T Nguyen

(74) *Attorney, Agent, or Firm* — RowanTree Law Group, PLLC; Frederick F. Rosenberger

(57) ABSTRACT

Disclosed is a connector with a barrier plate and an elastic arm. The connector can have a molding piece, a row of upper and lower terminals, and a metal partition board. The molding piece covers at least a portion of the metal partition board, which has an elastic arm emerging from a vertical wall of the molding piece and extending at an oblique angle. For example, when a wire-end connector is mated to a board-end connector, the housing of the former compresses the elastic arm and forms a ground connection with the elastic arm and the metal partition board in the board-end connector. Thus, the elastic arm can be utilized to form a ground loop with another connector.

8 Claims, 3 Drawing Sheets

(56) References Cited

U.S. PATENT DOCUMENTS

2008/0299828 A1* 12/2008 Gu .................... H01R 13/6582
439/607.01
2017/0194754 A1* 7/2017 Tsai .................... H01R 13/502
2017/0352991 A1 12/2017 Lin et al.
2017/0373438 A1* 12/2017 Qiu .................... H01R 13/64
2017/0373442 A1* 12/2017 Qiu .................... H01R 13/6581
2018/0358756 A1* 12/2018 Zhao .................... H01R 13/035
2019/0067879 A1* 2/2019 Zhao .................... H01R 13/533
2021/0384679 A1* 12/2021 Liao .................... H01R 12/51

* cited by examiner

CONNECTOR

CROSS-REFERENCE TO RELATED APPLICATIONS

This application claims priority under 35 U.S.C. § 119(a) to Chinese Patent Application No. 202210556522.4, filed on May 19, 2022, which is hereby incorporated by reference herein in its entirety.

TECHNICAL FIELD

The present disclosure relates to the field of connectors, in particular, a connector provided with an elastic arm.

BACKGROUND ART

Connectors are usually composed of male and female ends, which are connected by mating the male ends with the female ends. The transmission frequency requirements of the existing high-speed cable have been increasing, and the crosstalk changes generated by the high-speed cable need to be imported into the metal partition board, that is, the grounding of the metal partition board can achieve better anti-electromagnetic interference (anti-EMI) effect. However, the existing metal partition boards are all arranged inside the product, which are generally connected with the housing at the female-end of the connector, and the male-end of the connector is connected with the female-end after being plugged, and then connected with the housing to achieve grounding. This connection mode of housing grounding is very easy to affect the grounding effect due to the unstable tolerance during plugging, thus affecting the anti-EMI effect.

SUMMARY

In order to overcome the shortcomings of the prior art, the present disclosure provides a board-end connector with an elastic arm on the metal partition board, which achieves a stable grounding of the board-end connector and the wire-end connector through the extrusion and deformation of the elastic arm when the board-end connector and the wire-end connector are plugged together.

The technical solution of the present disclosure for solving the above technical problem is as follows: a connector comprising a molding piece, an upper terminal set, a lower terminal set and a metal partition board, wherein said molding piece covers at least a portion of said metal partition board, said metal partition board comprises at least one elastic arm which emerges from a vertical wall of said molding piece and extends at an oblique angle.

As a further improvement of the above technical solution, said molding piece comprises a base and a tongue portion which are one piece formed; said tongue portion extends outwardly from a front surface of the base, and said tongue portion comprises an upper terminal slot set and a lower terminal slot set; said upper terminal set has a front end embedded in said upper terminal slot set, and said upper terminal set is exposed from respective openings of said upper terminal slot set; said lower terminal set has a front end embedded in said lower terminal slot set, and said lower terminal set is exposed from respective openings of said lower terminal slot set; said metal partition board comprises two elastic arms and a barrier plate, and said two elastic arms are extended from the vertical wall located at both sides of said tongue portion.

As a further improvement of the above technical solution, said barrier plate of said metal partition board is located between the upper terminal slot set and the lower terminal slot set.

As a further improvement of the above technical solution, said barrier plate comprises a plurality of holes.

As a further improvement of the above technical solution, said barrier plate has connecting portions extending outwardly from both left and right ends of said barrier plate, an end of each of the connecting portions with said barrier plate while the other end connects with the elastic arm.

As a further improvement of the above technical solution, said metal partition board is one piece formed, said elastic arm extends at an oblique angle from the vertical wall of said molding piece in a direction away from said vertical wall, and said barrier plate comprises a three-dimensional structure folded in a U-shape.

As a further improvement of the above technical solution, said molding piece is further provided with an inwardly recessed elastic arm slot relative to the end of said elastic arm, said elastic arm slot is configured to accommodate the elastic arm deformed after being pressed.

As a further improvement of the above technical solution, said connector further comprises a metal housing in which said molding piece is fixed, and said metal housing is configured to be electrically connected to said metal partition board to form a ground loop.

As a further improvement of the above technical solution, said connector is a board-end connector, and said metal housing comprises a plurality of conductive pins.

The beneficial effects are as follows: the connector plug of the present disclosure is provided with a metal partition board and an elastic arm is provided thereon. When a wire-end connector is mated to a board-end connector, the housing of the wire-end connector compresses the elastic arm and forms a ground connection with the elastic arm and the metal partition board in the board-end connector. When the mating tolerance of the wire-end connector and the board-end connector becomes loose due to external influence after mating, the elasticity of the elastic arm allows the housing of the wire-end connector to remain connected to the metal partition board in a stable manner. The elastic arm is communicated with another connector, thereby selectively increasing a ground loop and ensuring the grounding effect.

BRIEF DESCRIPTION OF THE DRAWINGS

The present disclosure will be further described below with the accompanying drawings and examples:

FIG. 5 is a schematic diagram of the structure of the metal partition board according to one or more embodiments of the present disclosure, wherein:

1 is a molding piece; 11 is a base; 12 is a tongue portion; 13 is an elastic arm slot; 2 is an upper terminal set; 3 is a lower terminal set; 4 is a metal partition board; 41 is an elastic arm; 42 is a barrier plate; 43 is a connecting portion; and 5 is a metal housing.

DETAILED DESCRIPTION

The following will be a clear and complete description of the conception, specific structure and technical effects produced by the present disclosure with the embodiments and the accompanying drawings, in order to fully understand the purpose, features and effects of the present disclosure. Obviously, the described embodiments are only part but not all of the embodiments of the present disclosure, and based on the embodiments of the present disclosure, other embodiments obtainable by a person skilled in the art without creative labor fall within the protection scope of the present disclosure. In addition, all the coupling/connection relationships involved in this disclosure do not refer to the direct connection between the members alone, but to the fact that a better coupling structure can be composed by adding or reducing coupling auxiliary parts according to the specific implementation. The various technical features of the disclosure can be interactively combined without contradicting each other.

The terms “first”, “second”, etc. in the specification and claims of the present disclosure and the accompanying drawings are used to distinguish similar objects rather than describe a particular order or sequence. It should be understood that the data so used may be interchanged, where appropriate, for the purposes of the embodiments of the present disclosure described herein. The terms “comprising/including/having an element A or a portion A” in the specification and claims of the present disclosure, to the extent that they do not conflict with the original specification, are defined to mean that the number of the element A or the portion A is only one or more (i.e., two and more than two).

Figure 2:
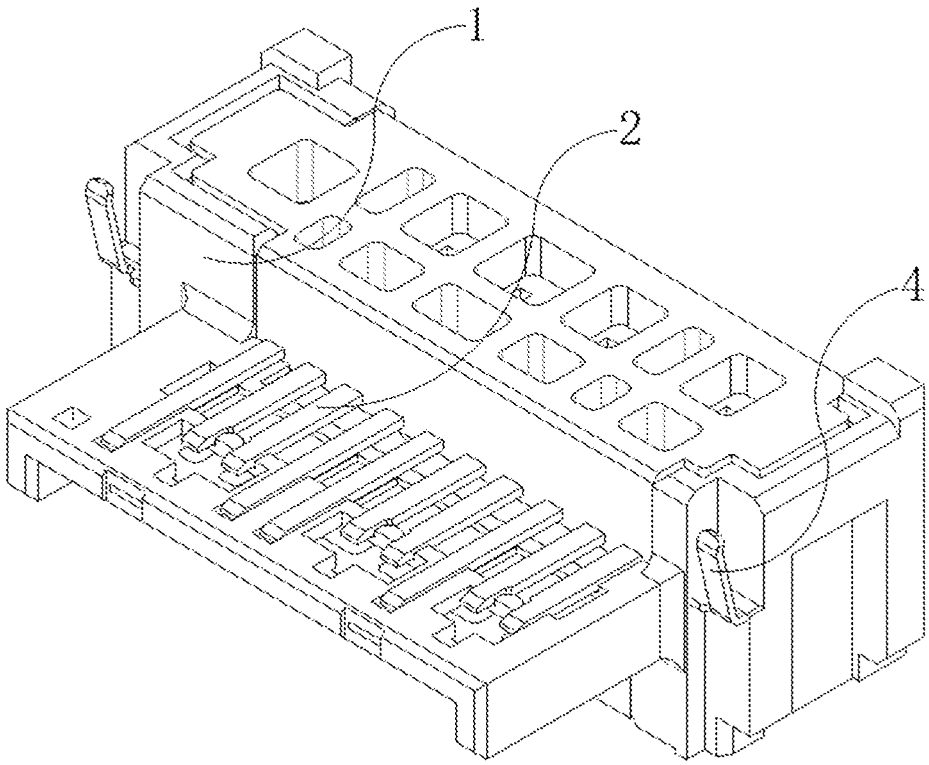
FIG. 2 is a schematic diagram of the internal structure of the assembly according to one or more embodiments of the present disclosure from an angle.
Figure 3:
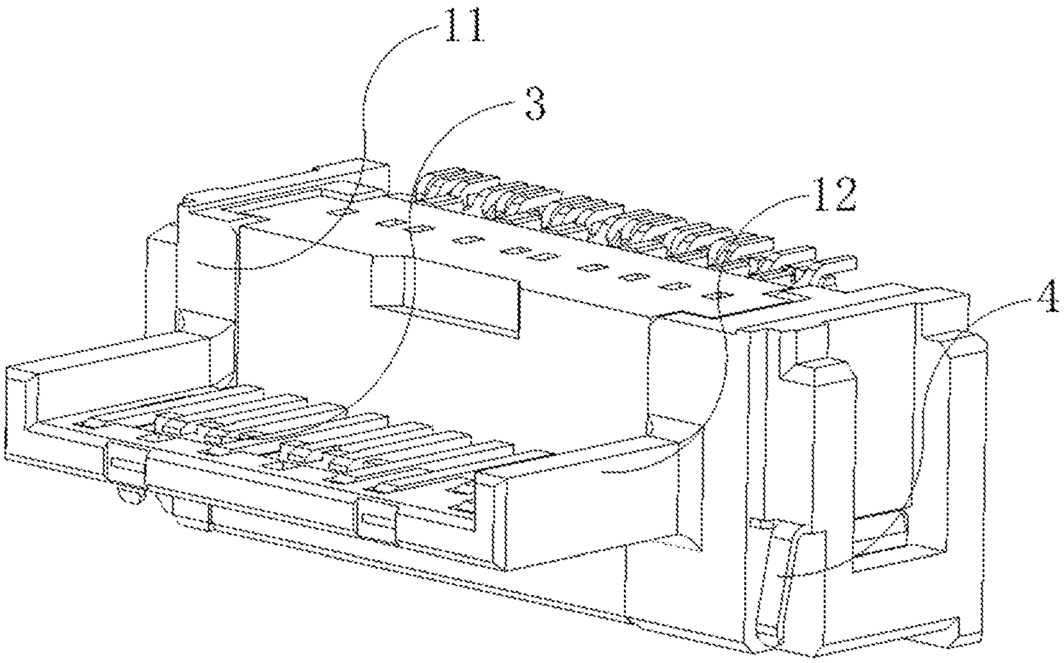
FIG. 3 is a schematic diagram of the internal structure of the assembly according to one or more embodiments of the present disclosure from another angle.

Referring to FIGS. 2 and 3, a connector provided with a barrier plate and an elastic arm 41 comprises a molding piece 1, an upper terminal set 2, a lower terminal set 3, and a metal partition board 4.

Figure 4:
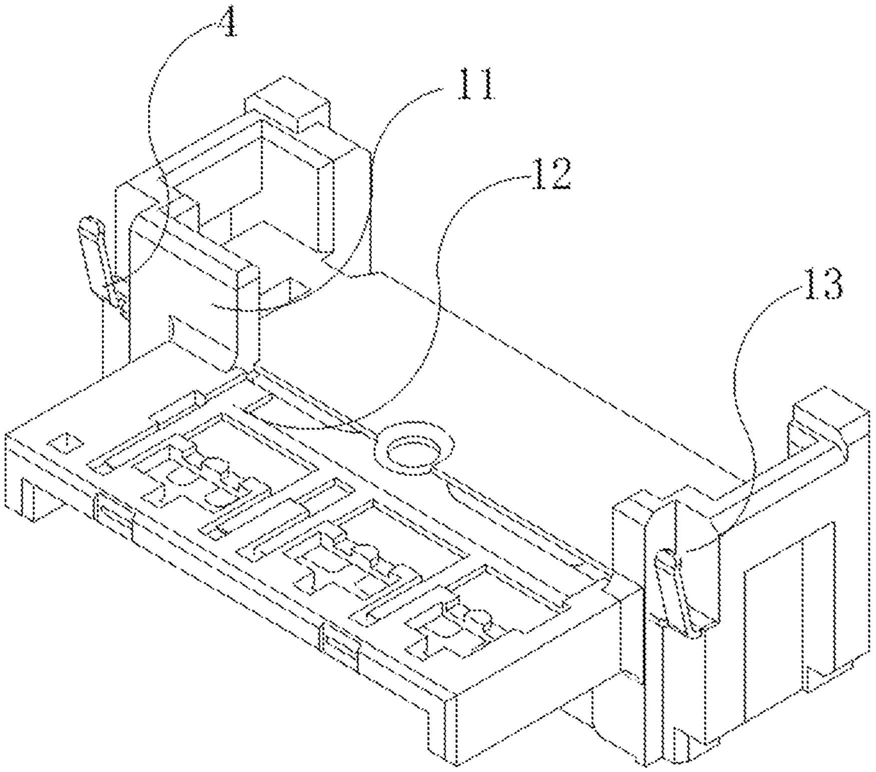
FIG. 4 is a schematic diagram of the structure of a molding piece according to one or more embodiments of the present disclosure.

Referring to FIG. 4 specifically, the molding piece 1 is a one piece formed structure by molding, which structure mainly supports and isolates various structures inside the connector. For the convenience of description, the moving direction of the connector during plugging is set as front direction. For example, with this board-end/female-end connector, the so-called front direction refers to the direction facing the wire-end/male-end connector.

The molding piece 1 comprises a base 11 and a tongue portion 12, which are one-piece-formed molding pieces. The tongue portion 12 extends outwardly from a front surface of the base 11. The tongue portion 12 comprises an upper terminal slot set and a lower terminal slot set. In one embodiment, the upper terminal slot set and the lower terminal slot set are formed on the upper surface and the lower surface of the tongue 12, respectively, and are suitable for terminal insertion. The upper terminal slot set includes a plurality of terminal slots connected to each channel running through the front and rear sides of the base 11. Each terminal slot of the upper terminal slot set is located on the same horizontal surface and parallel to each other, while the front end of each terminal slot is uncovered and can be connected to the external space. In addition, both sides of the base 11 are provided with elastic arm slots 13.

Figure 5:
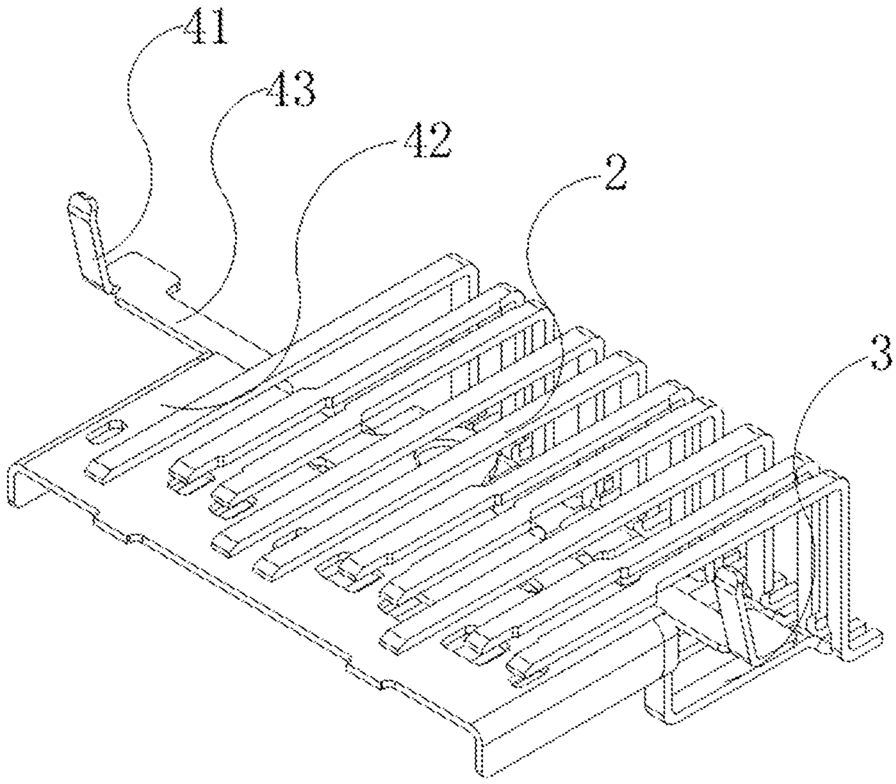

Referring to FIGS. 4 and 5, on one hand, the front end face of the tongue portion 12 has an inverted U shape, corresponding to the end face shape of the male-end connector. On the other hand, the tongue portion 12 is provided with a horizontal slot between the upper terminal slot set and the lower terminal slot set, and the horizontal slot is larger than the outer contour of the upper terminal slot set and the lower terminal slot set, and is suitable for a metal plate to be arranged therein to effectively isolate the space between the upper terminal slot set and the lower terminal slot set. In one embodiment, the horizontal slot, the upper terminal slot set, and the lower terminal slot set are provided separately from each other and are not connected. In another embodiment, the upper terminal slot set and the lower terminal slot set may be connected to the horizontal slot at the same time to allow the components in the upper terminal slot set and the lower terminal slot set to get in contact and in conduction with the components in the horizontal slot, respectively.

As shown in FIG. 5, the upper terminal set 2 and the lower terminal set 3 are each comprised of a plurality of metal terminals of different lengths and for different purposes, such as copper terminals. As shown in FIG. 2, the metal terminals with a longer end position than the front end are used for grounding, and the terminals set in pairs with a shorter end position than the rear end are used as differential pairs to transmit signals.

As shown in FIG. 5, the metal partition board 4 is stamped/cut from a one-piece-formed metal sheet, which comprises an elastic arm 41 and a barrier plate 42. The barrier plate 42 is used to absorb electromagnetic waves to prevent the passage thereof, and the absorbed electromagnetic wave energy will usually be conducted out as noise via the grounding terminal, which is connected directly or indirectly with the metal partition board 4. The so-called grounding terminal comprises, but is not limited to, the metal housing 5 of the board-end connector, the circuit board on which the board-end connector is located, or the metal housing of the wire-end connector and other components. As in FIG. 5, the barrier plate 42 is generally in the shape of an opening downward (for example, facing the circuit board direction) or inverted U-shaped set. That is, the barrier plate is generally a U-shaped three-dimensional structure which is formed by bending. The connecting portions 43 extend outwardly from the left and right ends of the rear end part of the inverted U-shaped barrier plate 42, and the ends of the connecting portions 43 are respectively connected with an elastic arm 41. When the barrier plate 42 is placed horizontally, the two elastic arms 41 extend forwardly and in the same or opposite up-and-down direction. In addition, in one embodiment, the barrier plate 42 is provided with a plurality of holes running through the upper and lower surfaces, and one of its functions is to allow the adhesive to enter to improve its fixing effect.

Figure 1:
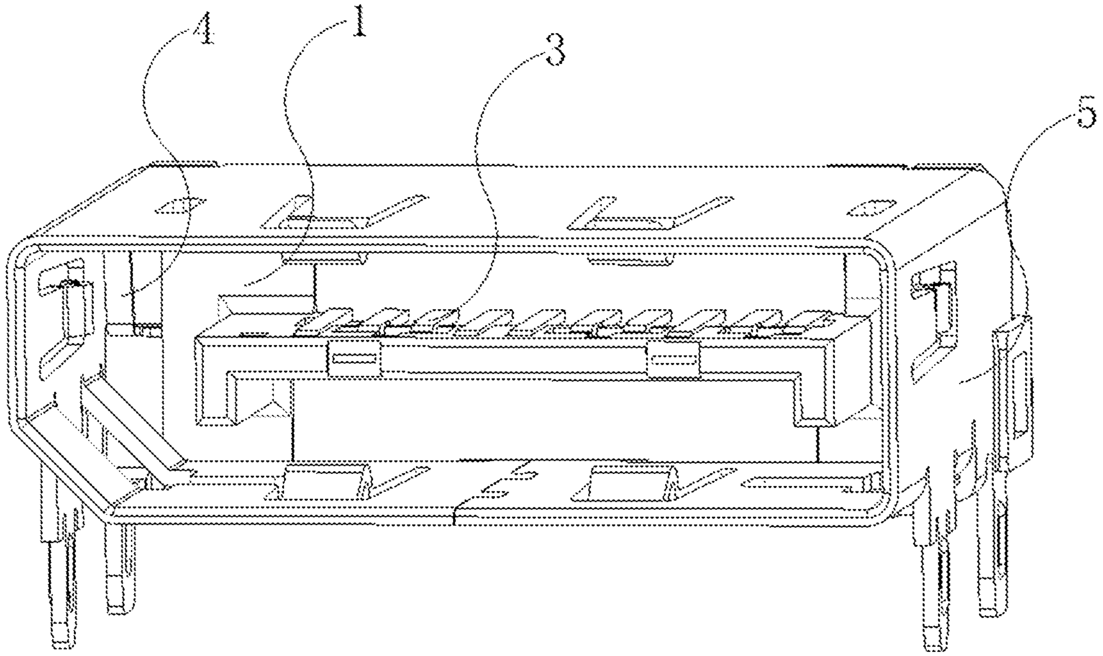
FIG. 1 is a schematic diagram of an assembly according to one or more embodiments of the present disclosure.

Referring to FIG. 1, the metal housing 5 is a hollow ring structure with a rectangular outer profile, suitable for the molding piece 1 to be fixed in it. The metal housing 5 can play a protective role on the outside, further improving the overall safety and stability of the connector. The metal housing 5 comprises a number of conductive pins for electrical connection to the circuit board. Said metal housing 5 can be in direct contact with and electrically connected to said metal partition board 4 be part of the grounding terminal.

In one embodiment, the molding piece 1 is directly formed outside the metal partition board 4 by injection molding process, i.e., the two are not plugged together, so as to reduce the gap between the metal partition board 4 and the molding piece 1 and ensure a tight bond between them. However, after appropriate structural adjustment, the metal partition board 4 can also be changed to a plug-in type. The present disclosure does not limit this more. In one embodiment, the upper terminal set 2 and the lower terminal set 3 are plug-in type, but when needed, they can also be arranged in the forming mold of the molding piece 1 and fixed by the adhesive material in the same way as the manufacturing of the metal partition board 4.

After assembly, the molding piece covers at least a part of the metal partition board 4 therein. At the same time, a part of the metal partition board 4 is electrically connected to the metal housing 5 by direct contact or connection, whereby the noise of the metal partition board 4 can be directed to the ground connection pad of the circuit board by means of the pins of the metal housing 5 to form a ground loop.

On the other hand, the elastic arm 41 emerges from the vertical wall located at said molding piece 1 and extends forwardly at an oblique angle. The elastic arm 41 extending from the metal partition board of the female-end connector is configured to directly contact with the housing of the male-end/wire-end connector, thus forming another ground loop, improving the grounding effect and ensuring efficient and stable signal transmission. And the elastic arm 41 has elasticity. The resiliently provided elastic arm 41 forms an elastic contact with the housing of the male connector when the male-end connector is connected to the female-end connector. Once the plug connection between the male connector and the female connector is loose, this elastic contact allows the elastic arm 41 to remain in stable contact with the housing of the male connector after rebounding, which ensures the stability of electrical connection. This plugging structure, which is used to ensure the stability of the connection when plugging, can achieve the effect of a stable electrical connection when plugging anywhere. Said elastic arms 41 emerge from each vertical wall at the left and right side of said tongue 12.

The base 11 of the molding piece 1 is longer than the tongue portion 12, so both sides of the front surface of the base 11 will be directly connected with the plug, and providing the elastic arm 41 on either side can achieve a stable connection effect. In some embodiments, both sides will be provided with the elastic arm 41, so that the force is more stable when inserted.

The lower terminal set 3 is exposed from the respective openings of the lower terminal slot set. When the specification and claims of the present disclosure recite that element A is exposed from element B, it is defined that the element A is not completely covered by the element B, provided that it does not conflict with the original documented content. The upper terminal set 2 is provided similarly to the lower terminal set 3 and will not be described repeatedly. The tongue portion 12 of the molding piece 1 can support the upper terminal and the lower terminal 3 separately to prevent contact between adjacent terminals due to deformation by external force. The tongue portion 12 of the molding piece 1, which is arranged between the upper terminal set 2 and the lower terminal set 3, will not affect the plugging of the terminals and will improve the rigidity of the plugging, so as to prevent the terminals from being extruded due to the unstable force received by the plugging deformation and other problems.

The elastic arms 41 emerge from said vertical wall at the left or right side of said tongue portion 12. The base 11 of the molding piece 1 is longer than the tongue portion 12, so that the front surface of the base 11 on both sides will be directly connected with the plug, and a stable connection effect can be achieved by arranging the elastic arm on either side. In some embodiments, elastic arms will be arranged on both sides, so that the force is more stable when plugging.

As an embodiment of this disclosure, the majority of said metal partition board 4 is located inside said molding piece 1 except for said elastic arm 41, and only a small part is exposed from said molding piece 1. The molding piece 1 is formed integrally on the periphery of said metal partition board 4. The metal partition board 4 is partially located in the tongue portion 12 of the molding piece 1, and the base 11 of the molding piece 1 is longer than the tongue portion 12, so that the metal partition board 4 has two extensions on both sides, and thus the elastic arms 41 located at the ends of the metal partition board 4 can extend out of the molding piece 1 in front of the base 11 on both sides. This arrangement allows the elastic arm 41 to get in contact with the connection when plugging. Meanwhile, the elastic arm 41 does not extend forwardly beyond the tongue portion 12 of the molding piece 1, which would not increase the overall size of the connector. Since a portion of the metal partition board 4 is located in the equipment structure of the molding piece 1, and since the upper and lower sides of the structure of the tongue portion 12 are provided with an upper terminal slot set and a lower terminal slot set, respectively, a portion of said metal partition board 4 is located between said upper terminal slot set and said lower terminal slot set.

As one of the embodiments of this disclosure, the metal partition board 4 is one piece formed. The one-piece-formed structure can ensure the stability of the overall structure of the metal partition board 4. Said elastic arm 41 extends at an oblique angle from the vertical wall of said molding piece 1 to the direction away from the molding piece 1, and the inclined extension direction provides sufficient buffer space for the deformation of the elastic arm 41. The molding piece 1 is also provided with an inwardly recessed elastic arm slot 13 relative to said elastic arm 41, and said elastic arm slot 13 is used to accommodate the elastic arm 41 deformed after being pressed. The slot of the elastic arm 41 can be arranged to further increase the buffer space of the elastic arm 41. When plugging, the elastic arm 41 is pressed into the elastic arm slot 13, and the plug connectors can be contacted at both edges, or inserted into a deeper distance. The closer distance between the two main bodies of the plug connectors increases the overall stability of plugging. Optionally, another ground loop can be added to ensure grounding effect.

The above merely describes specific embodiments of the present disclosure, which is not intended to limit the scope of protection of the present disclosure. Any modifications, equivalent variations or substitutions, and improvements made within the spirit and principle of the present disclosure by those skilled in the art according to the disclosed technical scope should be included in the protection scope of the present disclosure.

The invention claimed is:

1. A connector, comprising:

a molding piece;

an upper terminal set;

a lower terminal set; and a metal partition board, wherein said molding piece covers at least a portion of said metal partition board, wherein said molding piece comprises a base and a tongue portion which are one piece formed, said tongue portion extending outwardly from a front surface of said base, wherein said tongue portion comprises an upper terminal slot set and a lower terminal slot set, wherein said upper terminal set has a front end embedded in said upper terminal slot set, and said upper terminal set is exposed from respective openings of said upper terminal slot set, wherein said lower terminal set has a front end embedded in said lower terminal slot set, and said lower terminal set is exposed from respective openings of said lower terminal slot set, and wherein said metal partition board comprises two elastic arms and a barrier plate, said two elastic arms emerging from vertical walls located at both sides of said tongue portion and extending at an oblique angle.

2. The connector according to claim 1, wherein said barrier plate of said metal partition board is located between said upper terminal slot set and said lower terminal slot set.

3. The connector according to claim 2, wherein said barrier plate comprises a plurality of holes.

4. The connector according to claim 2, wherein said barrier plate has connecting portions extending outwardly from both left and right ends of said barrier plate, and an end of each of said connecting portions connects with said barrier plate while another end connects with said elastic arm.

5. The connector according to claim 4, wherein a whole of said metal partition board is one piece formed, said elastic arm extends at an oblique angle from said vertical wall of said molding piece in a direction away from said vertical wall, and said barrier plate comprises a three-dimensional structure bent in a U-shape.

6. The connector according to claim 4, wherein said molding piece is further provided with an inwardly recessed elastic arm slot relative to the end of said elastic arm, and said elastic arm slot is configured to accommodate the elastic arm deformed after being pressed.

7. The connector according to claim 4, wherein said connector further comprises a metal housing in which said molding piece is fixed, and said metal housing is configured to be electrically connected to said metal partition board to form a ground loop.

8. The connector according to claim 7, wherein said connector is a board-end connector, and said metal housing comprises a plurality of conductive pin.

* * * * *